US008867557B2

(12) United States Patent
Jeon et al.

(10) Patent No.: US 8,867,557 B2
(45) Date of Patent: Oct. 21, 2014

(54) METHOD FOR PROVIDING SELECTIVE SERVICE BY SELECTIVE SERVICE MODULE AND HOME GATEWAY USING THE SAME

(75) Inventors: Ki Man Jeon, Seongnam-si (KR); Hyun Woo Kim, Seoul (KR); Jae Gi Son, Seongnam-si (KR); Chang Won Park, Suwon-si (KR)

(73) Assignee: Korea Electronics Technology Institute, Seongnam-Si, Gyeonggi-Do (KR)

( * ) Notice: Subject to any disclaimer, the term of this patent is extended or adjusted under 35 U.S.C. 154(b) by 134 days.

(21) Appl. No.: 13/339,896

(22) Filed: Dec. 29, 2011

(65) Prior Publication Data

US 2012/0170589 A1  Jul. 5, 2012

(30) Foreign Application Priority Data

Jan. 5, 2011 (KR) .......................... 10-2011-0001141

(51) Int. Cl.
*H04L 12/28* (2006.01)
*G06F 3/14* (2006.01)

(52) U.S. Cl.
CPC .......... *G06F 3/1431* (2013.01); *G09G 2370/10* (2013.01)

USPC ........................................................ 370/401

(58) Field of Classification Search
None
See application file for complete search history.

(56) References Cited

U.S. PATENT DOCUMENTS

| 6,046,760 | A | * | 4/2000 | Jun | 725/100 |
|---|---|---|---|---|---|
| 2006/0047466 | A1 | * | 3/2006 | White | 702/130 |
| 2010/0152600 | A1 | * | 6/2010 | Droitcour et al. | 600/534 |
| 2011/0004276 | A1 | * | 1/2011 | Blair et al. | 607/60 |
| 2014/0213845 | A1 | * | 7/2014 | Bechtel et al. | 600/28 |

* cited by examiner

*Primary Examiner* — Chi H Pham
*Assistant Examiner* — Raul Rivas
(74) *Attorney, Agent, or Firm* — Lowe Hauptman & Ham, LLP

(57) ABSTRACT

A selective service providing method using a selective service module, and a home gateway using the same are provided. A home gateway includes a module port for mounting a service module which provides a particular service; a communication interface for receiving a function result of the service module mounted to the module port; a display interface connected with a display; and a processor for sending the function result received from the service module through the communication interface, to the display through the display interface. Thus, the user's intended service can be selectively provided using the selective service module.

5 Claims, 3 Drawing Sheets

METHOD FOR PROVIDING SELECTIVE SERVICE BY SELECTIVE SERVICE MODULE AND HOME GATEWAY USING THE SAME

CROSS-REFERENCE TO RELATED APPLICATION(S) AND CLAIM OF PRIORITY

The present application claims the benefit under 35 U.S.C. §119(a) to a Korean patent application filed in the Korean Intellectual Property Office on Jan. 5, 2011, and assigned Serial No. 10-2011-0001141, the entire disclosure of which is hereby incorporated by reference.

TECHNICAL FIELD OF THE INVENTION

The present invention relates generally to a service providing method and a home gateway using the same. More particularly, the present invention relates to a method for providing various services to a user over a home network, and a home gateway using the same.

BACKGROUND OF THE INVENTION

As home gateways in the home are converged and complexity of various services increases, industry vitalization reaches the limit because of development and compatibility problems of core service modules (H/W and S/W).

In particular, in an intelligent home network industry, a platform and a resource management module capable of ensuring interoperability between services are required. Diversity of a STB or a modem supplied by a provider according to various services is an obstacle to the development of the home network.

So far, while a variety of services are provided based on the home gateway in the home, their convergence is limited by different service types and modules.

SUMMARY OF THE INVENTION

To address the above-discussed deficiencies of the prior art, it is a primary aspect of the present invention to provide a method for selectively providing a user's intended service using a selective service module, and a home gateway using the same.

According to one aspect of the present invention, a home gateway includes a module port for mounting a service module which provides a particular service; a communication interface for receiving a function result of the service module mounted to the module port; a display interface connected with a display; and a processor for sending the function result received from the service module through the communication interface, to the display through the display interface.

The module port may include a first module port for mounting a first service module which provides a first service; and a second module port for mounting a second service module which provides a second service. The communication interface may receive a first function result of the first service module from the first module port, and receive a second function result of the second service module from the second module port.

The processor may send at least one of the first function result and the second function result received through the communication interface, to the display through the display interface.

The service module may include at least one of a module for providing a health related service, a module for providing an entertainment service, a module for controlling home appliances, a module for providing environment information, and a module for supporting wireless communication of mobile devices.

When the service module is the module for providing the health related service, the function result may be an analysis result of health related data.

After additionally processing the function result, the processor may send the function result to the display through the display interface.

The home gateway may further include an external interface for communicatively connecting with an external device. The processor may process data received from an external device connected to the external interface and send the processed data to the display through the display interface.

According to another aspect of the present invention, a service providing method includes receiving a function result of a service module which provides a particular service and is mounted to a module port; and sending the function result received from the service module to a display through a display interface.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, like reference numerals will be understood to refer to like parts, components and structures.

DETAILED DESCRIPTION OF THE INVENTION

The following description with reference to the accompanying drawings is provided to assist in a comprehensive understanding of exemplary embodiments of the invention as defined by the claims and their equivalents.

Figure 1:
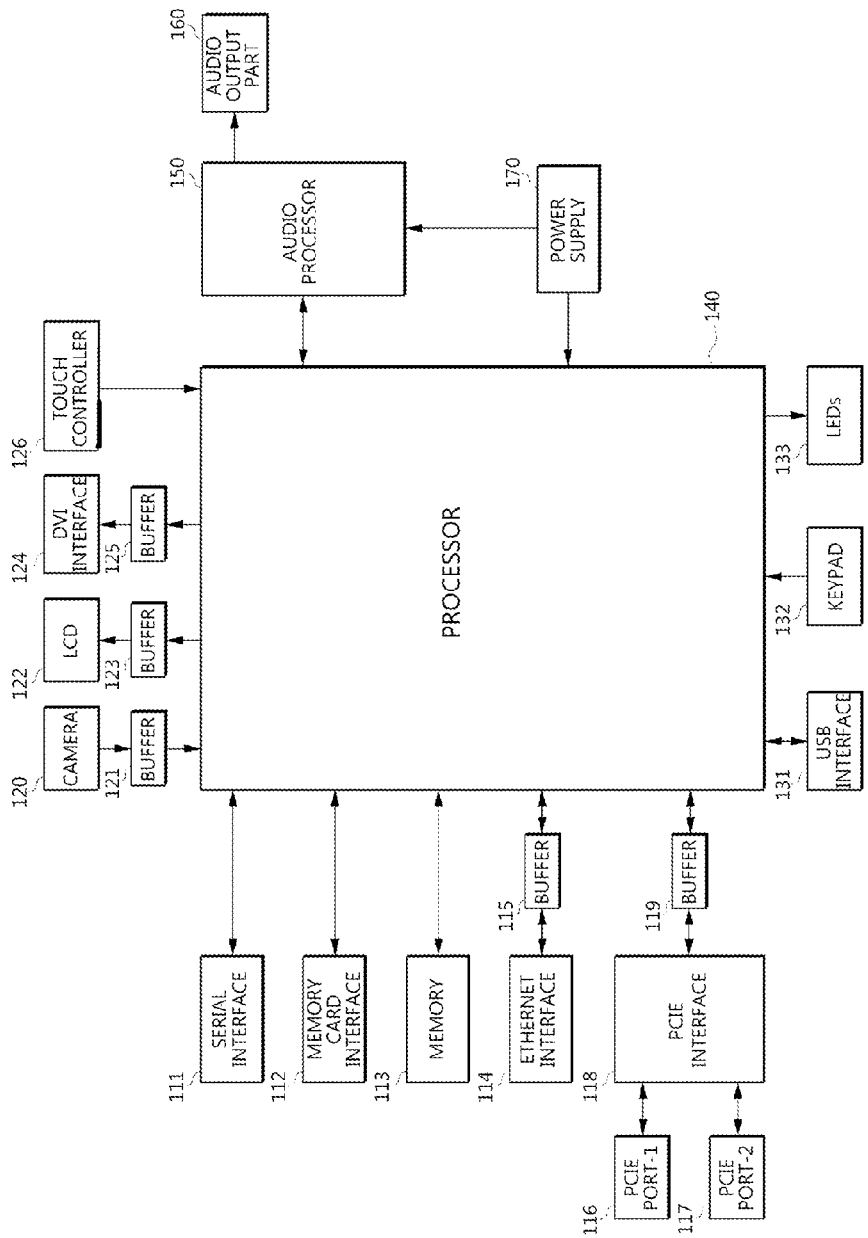
FIG. 1 is a block diagram of a home gateway according to an exemplary embodiment of the present invention.

FIG. 1 is a block diagram of a home gateway according to an exemplary embodiment of the present invention. The home gateway interoperates various home appliances based on a home network.

The home gateway includes, as shown in FIG. 1, a serial interface 111, a memory card interface 112, a memory 113, an Ethernet interface 114, PCIE ports 116 and 117, a PCIE interface 118, a camera 120, an LCD 122, a DVI interface 124, a touch controller 126, a USB interface 131, a keypad 132, OEDs 133, a processor 140, an audio processor 150, an audio output part 160, and a power supply 170.

The serial interface 111 provides an interface for communicating with an external device in series, and the memory card interface 112 provides an interface for communicating data with a memory card mounted.

The memory 113 provides a storage space for storing a program for driving the processor 140 and data generating in the program execution. The Ethernet interface 114 provides an interface for accessing the Ethernet established in the home. A buffer 115 buffers data transmitted and received in the networking.

A service module is mounted to the PCIE ports 116 and 117. The service module is a module for providing a particular service, and includes 1) a health care module for executing a health related service of a user, 2) an entertainment module for providing the user with an entertainment service such as contents and amusements, 3) a home control module for controlling the home appliances, 4) an environment measurement module for providing indoor/outdoor environment information, and 5) a mobile service module for supporting wireless communication of mobile devices.

To provide the service to the user, the service module performs a particular function and outputs its function result to the connected PCIE ports 116 and 117.

For example, when the health care module is mounted to the first PCIE port 116, the health care module can collect health related data (e.g., blood sugar or blood pressure) of the user, check the health by analyzing the collected data, and output the health check condition, as the function result, to the connected first PCIE port 116.

For example, when the entertainment module is mounted to the second PCIE port 117, the entertainment module can execute a game of the user, generate screen/sound according to user's manipulation input through a joystick wirelessly connected to the entertainment module, and output the generated screen/sound, as the function result, to the connected second PCIE port 117.

For example, when the environment measurement module is mounted to the second PCIE port 117, the environment measurement module can generate an environment guide screen by synthesizing indoor/outdoor environment data collected, and output the generated environment guide screen, as the function result, to the second PCIE port 117 connected.

Meanwhile, the connection style of the service module to the PCIE ports 116 and 117 is not limited. That is 1) the service modules can be mounted to both of the PCIE ports 116 and 117, 2) the service module can be mounted to any one of the PCIE ports 116 and 117, and 3) no service modules can be mounted to the PCIE ports 116 and 117.

When the service modules are mounted to both of the PCIE ports 116 and 117, different services modules can be mounted to the first and second PCIE ports 116 and 117 respectively in most cases. Yet, the same service modules can be mounted to the PCIE ports 116 and 117.

The PCIE interface 118 forwards at least one service (i.e., the function result) provided from at least one module through the PCIE ports 116 and 117, to the processor 140 via the buffer 119.

The camera 120 generates an image by photographing. The buffer 121 temporarily stores the image data generated by the image capturing of the camera 120.

The LCD 122 is a small display for displaying information of the operation status of the home gateway. The buffer 123 is a storage space for temporarily storing information to be displayed in the LCD 122.

The DVI interface 124, which is an interface for connecting a large display such as TV, transmits images to the TV. The buffer 123 is a storage space for buffering the images to be transmitted to the TV.

The touch controller 126 is a means for inputting a user command through the touch manipulation. The USB interface 131 is an interface for mounting USB devices communicatively connected according to a USB standard.

The keypad 132 is a set of keys (buttons) for receiving the user command. The LEDs 133 is a set of LEDs for guiding the operation status of the home gateway.

The audio processor 150 converts audio data applied from the processor 140 to a playable signal. The audio output part 160 outputs an audio signal fed from the audio processor 150 so that the user can listen to it.

The power supply 170 converts AC power applied from the outside, to DC power and then supplies the DC power to the processor 140, the audio processor 150, and so on.

The processor 140 communicates with the external device connected to the serial interface 111 and the external device connected to the USB interface 131, and accesses the Ethernet through the Ethernet interface 114.

Figure 2:
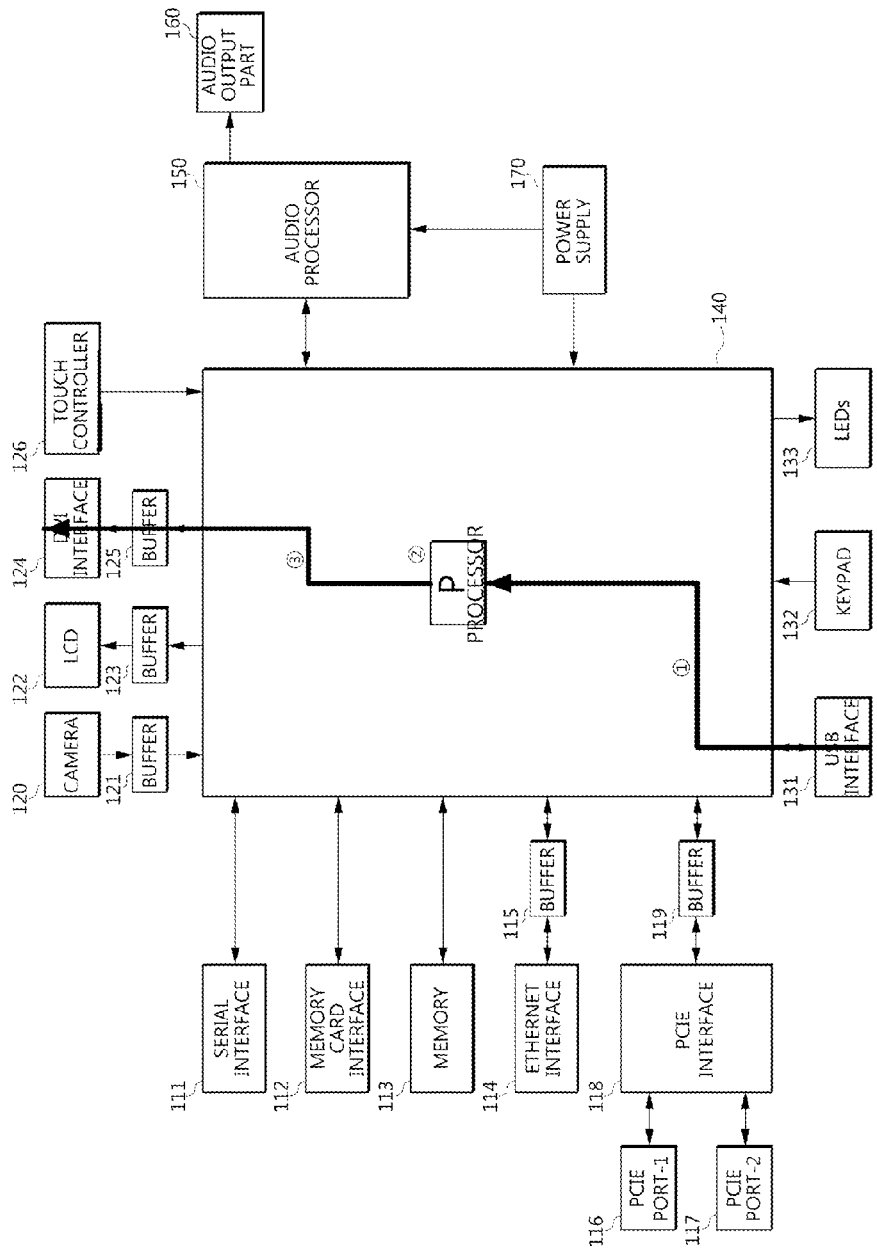
FIG. 2 is a diagram of a method of a processor for processing data received from an external device and sending the processed data to a TV.

In so doing, the processor 140 can process the data received from the external device or the Ethernet. For example, when receiving a file stored to a USB memory (not shown) connected to the USB interface 131 in step ① as shown in FIG. 2, the processor 140 can generate image data by processing (playing) the file in step ② and send the generated image data to the TV through the DVI interface 124 so as to display image contents in the TV.

The processor 140 may output the image captured by the camera 120 to the DVI interface 124 or store the image to the memory card mounted to the memory card interface 112.

The processor 140 records or reads the data to or from the memory card mounted to the memory card interface 112.

The processor 140 receives the user command through the touch controller 126 and the keypad 132, and outputs the operation status of the home gateway through the LCD 122 and the LEDs 133.

Meanwhile, the processor 140 receives the service (i.e., the function result) provided from the service module mounted to the PCIE ports 116 and 117, from the PCIE interfacet 118 via the buffer 119. This service can be received as the image screen.

The received service is completely processed by the service module. Hence, the processor 140 does not need additional processing and only has to send the provided service to the TV through the DVI interface 124.

Figure 3:
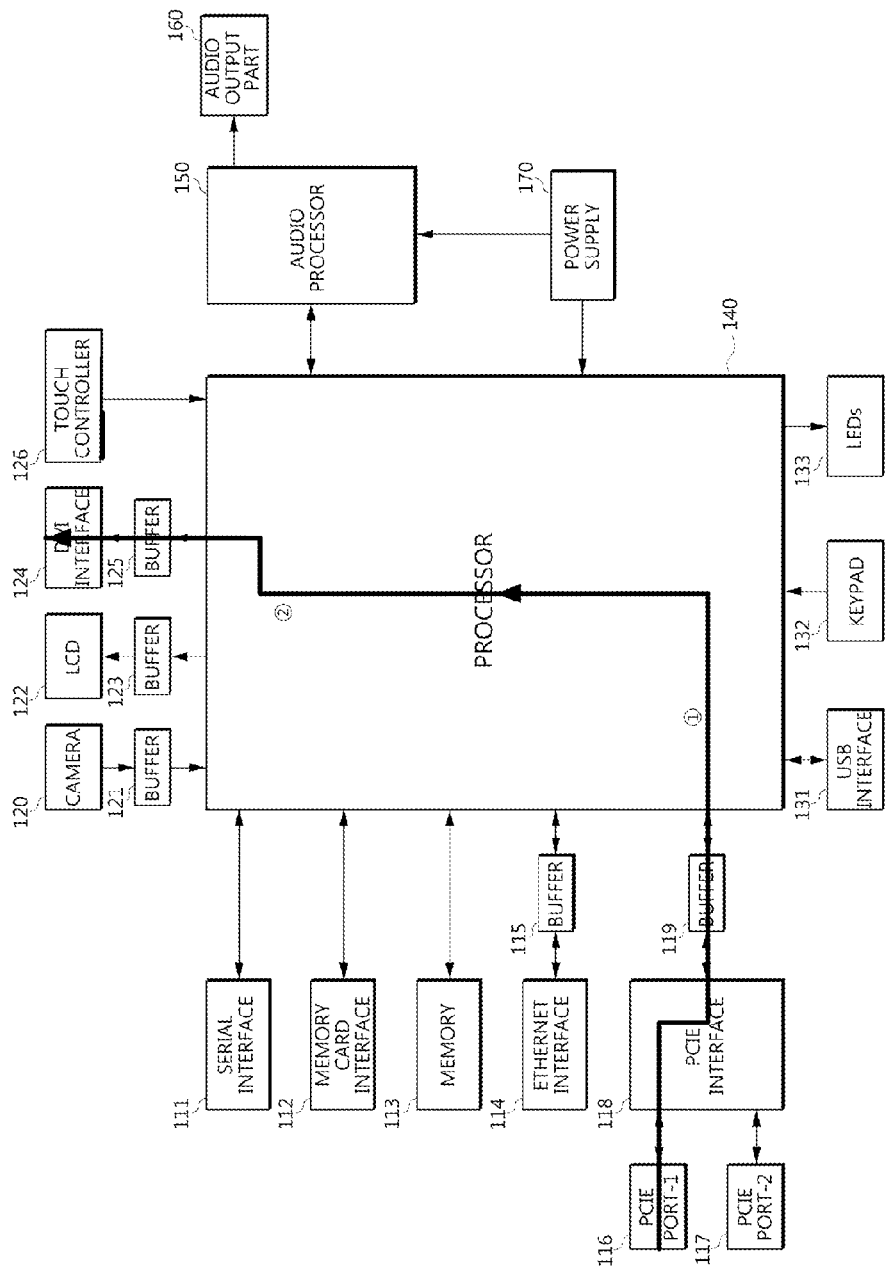
FIG. 3 is a diagram of a method of the processor for forwarding the data from the service module to the TV without processing the data.

For example, when receiving the service as the image screen from the service module connected to the first PCIE port 116 in step ① as shown in FIG. 3, the processor 140 can send the image screen to the TV through the DVI interface 124 in step ② so as to display the image screen of the service in the TV.

In further detail, 1) when the service module is the health care module, the TV displays a health condition guide screen, 2) when the service module is the entertainment module, the TV displays an entertainment/content screen, and 3) when the service module is the environment measurement module, the TV displays an indoor/outdoor environment information guide screen.

Referring to FIG. 3, since the service module, rather than the processor 140, processes the service to the TV, the load of the processor 140 can be reduced.

Although the received service is already processed by the service module, when the additional processing of the processor 140 is required, the processor 140 can additionally process the received service and send the service to the TV through the DVI interface 124. In this case, the additional processing of the processor 140 is supplementary and does not act as great load to the processor 140. The main processing is conducted by the service module.

As explained above, since the user's intended service is selectively provided using the selective service module, the user's selective service is feasible by supporting the modular-type service module according to the convergence of the home network service.

In addition, it is possible to provide an open home platform for supporting the modular-type home service, to support heterogeneous home network environments in the home according to the convergence of the ubiquitous environment and the next-generation wired/wireless network, and to support the modular-type integrated service support home platform and the service module for supporting the user selection service.

It is also possible to prevent the performance degradation in the service expansion and the service migration. Even when a new service of the user generates, the common resources to support the home network can be shared fundamentally and thus it is advantageous in terms of the development duration and costs of a service developing company.

Further, the connectivity with the existing home network service can be reinforced by supporting the home gateway.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A home gateway, comprising:
   PCI Express (PCIE) module ports configured to mount service modules which provide corresponding different services;
   a communication interface configured to receive function results of the service modules mounted to the PCIE module ports;
   a display interface configured to be connected with a display;
   a processor configured to send one or more of the function results received from the service modules through the communication interface, to the display through the display interface;
   a health care module mounted in a first PCIE module port of the PCIE module ports and configured to
      collect health related data of a user,
      analyze the collected data,
      check a health condition of the user based on the analyzed data, and
      output the checked health condition, as a first function result, via the first PCIE module port, to the processor;
   an entertainment module mounted in a second PCIE module port of the PCIE module ports and configured to
      execute a game program,
      generate a screen and sound according to user's manipulation input through a joystick wirelessly connected to the entertainment module, and
      output the generated screen and sound, as a second function result, via the second PCIE module port, to the processor; and
   an environment measurement module mounted in a third PCIE module port of the PCIE module ports and configured to
      synthesize indoor and outdoor environment data collected,
      generate an environment guide screen by the synthesized data, and
      output the generated environment guide screen, as a third function result, to the third PCIE module port,
   wherein the processor is further configured to send at least one of the first function result and the second function result received through the communication interface, to the display through the display interface, and
   wherein the processor is further configured to additionally process one or more of the function results and send the processed one or more function results to the display through the display interface.

2. The home gateway of claim 1,
   wherein the communication interface is configured to receive the first function result from the first PCIE module port, and the second function result from the second PCIE module port.

3. The home gateway of claim 1, wherein the service modules further comprise at least one of a module for controlling home appliances, a module for providing environment information, and a module for supporting wireless communication of mobile devices.

4. The home gateway of claim 1, further comprising:
   an external interface configured to communicatively connect with an external device,
   wherein the processor is further configured to
      process data received from the external device connected to the external interface, and
      send the processed data to the display through the display interface.

5. A service providing method, comprising:
   collecting, by a health care module which provides a health care service and is mounted in a first PCIE module port of PCI Express (PCIE) module ports of a home gateway, health related data of a user;
   analyzing, by the health care module, the collected data;
   checking, by the health care module, a health condition of the user based on the analyzed data;
   receiving, by the home gateway, the health condition of the user from the health care module, via the first PCIE module port;
   sending, by the home gateway, the health condition received from the health care module to a display through a display interface of the home gateway;
   execute, by an entertainment module which provides a game service and mounted in a second PCIE module port of the PCIE module ports, a game program;
   generate, by the entertainment module, a screen and sound according to user's manipulation input through a joystick wirelessly connected to the entertainment module;
   synthesizing, by an environment measurement module, indoor and outdoor environment data collected;
   generating, by the environment measurement module, an environment guide screen by the synthesized data;
   outputting, by the environment measurement module, the generated environment guide screen to a third PCIE module port,
   receiving, by the home gateway, the one or more generated screens and sounds from at least one of the entertainment module and the environment measurement module, via the second or the third PCIE module port; and
   output, by the home gateway, the one or more screens and sounds received from the at least one of the entertainment module and the environment measurement module to the display through the display interface of the home gateway.

* * * * *